No. 802,718. PATENTED OCT. 24, 1905.
G. STEWART.
MACHINE FOR MOLDING PLASTIC MATERIALS.
APPLICATION FILED APR. 26, 1905.

3 SHEETS—SHEET 1.

WITNESSES:
H. G. Dieterich
C. R. Ferguson

INVENTOR
George Stewart
BY
Munn
ATTORNEYS

No. 802,718. PATENTED OCT. 24, 1905.
G. STEWART.
MACHINE FOR MOLDING PLASTIC MATERIALS.
APPLICATION FILED APR. 26, 1905.

3 SHEETS—SHEET 2.

WITNESSES:
H. F. Dietrich
C. R. Ferguson

INVENTOR
George Stewart
BY
ATTORNEYS

No. 802,718. PATENTED OCT. 24, 1905.
G. STEWART.
MACHINE FOR MOLDING PLASTIC MATERIALS.
APPLICATION FILED APR. 26, 1905.

3 SHEETS—SHEET 3.

WITNESSES:
H. S. Dietrich
C. R. Ferguson

INVENTOR
George Stewart
BY Munn
ATTORNEYS

UNITED STATES PATENT OFFICE.

GEORGE STEWART, OF NEW YORK, N. Y.

MACHINE FOR MOLDING PLASTIC MATERIALS.

No. 802,718.        Specification of Letters Patent.        Patented Oct. 24, 1905.

Application filed April 26, 1905. Serial No. 257,449.

*To all whom it may concern:*

Be it known that I, GEORGE STEWART, a citizen of the United States, and a resident of the city of New York, borough of Brooklyn, in the county of Kings and State of New York, have invented a new and Improved Machine for Molding Plastic Material, of which the following is a full, clear, and exact description.

This invention relates to improvements in machines for molding or forming articles from plastic materials—such as concrete blocks, brick, ornaments, &c.—the object being to provide a machine of this character that will be simple in construction, easily operated, and by means of which the work may be rapidly carried on.

I will describe a machine for molding plastic material embodying my invention and then point out the novel features in the appended claims.

Reference is to be had to the accompanying drawings, forming a part of this specification, in which similar characters of reference indicate corresponding parts in all the figures.

Figure 1:
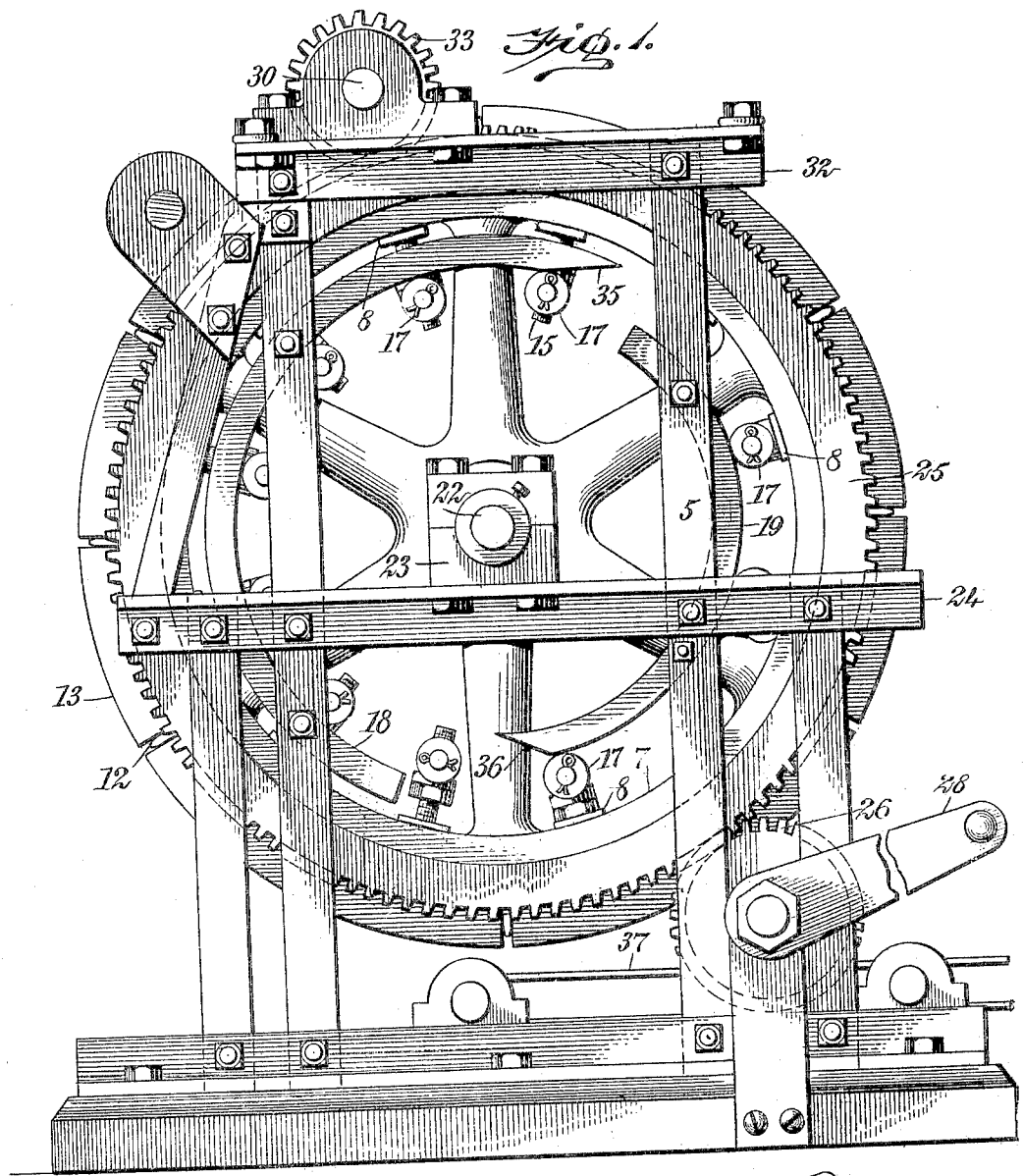
Figure 6:
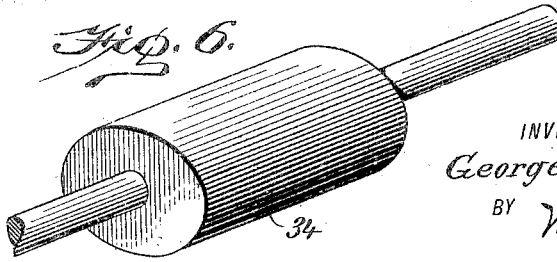
Figure 2:
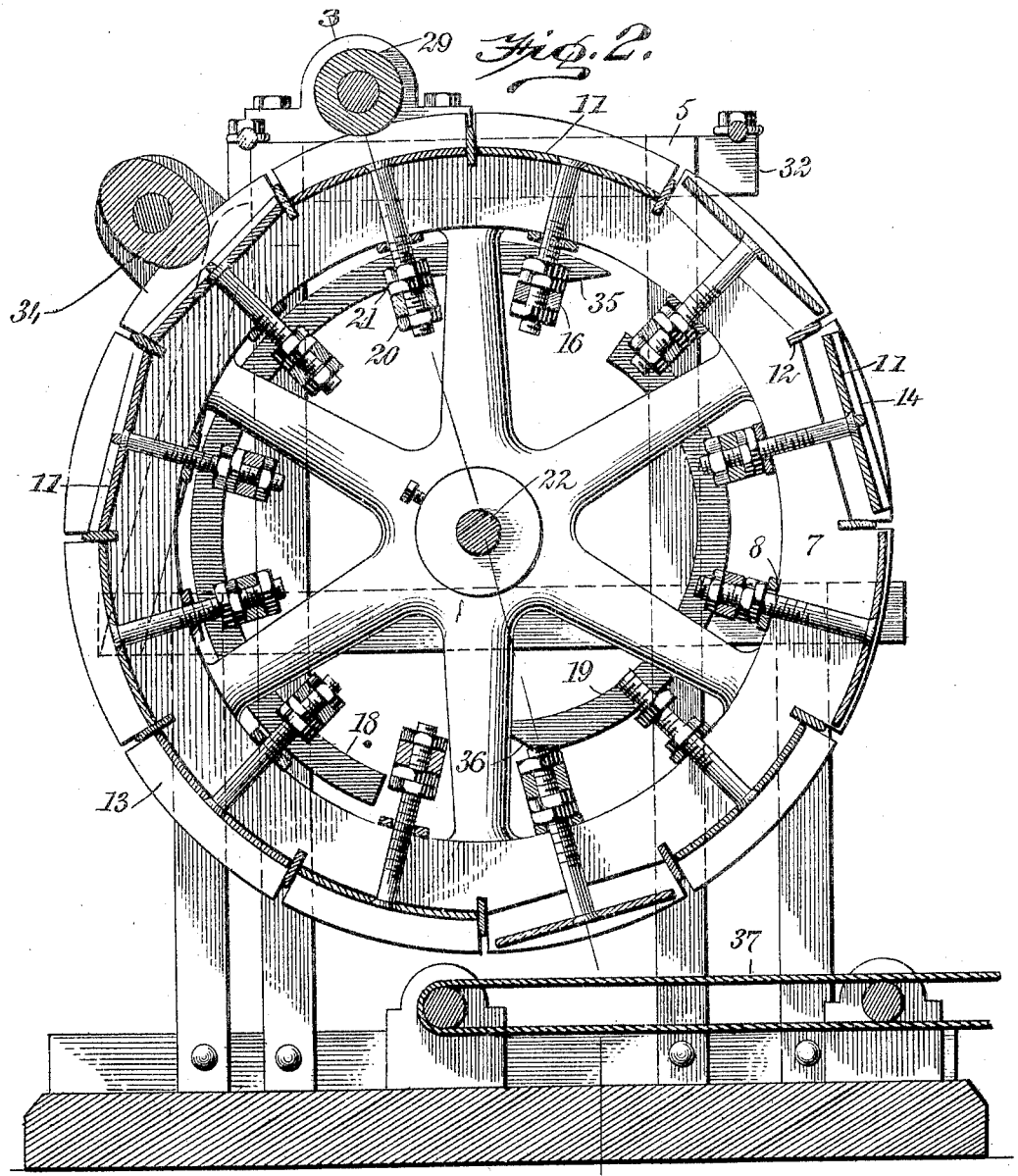
Figure 4:
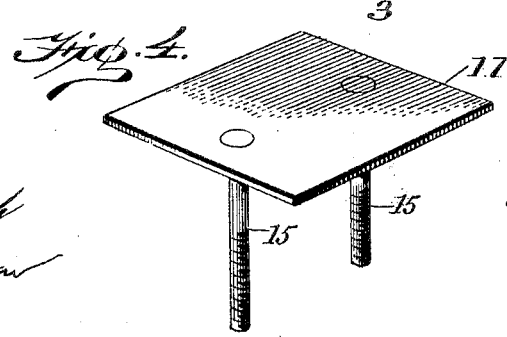
Figure 3:
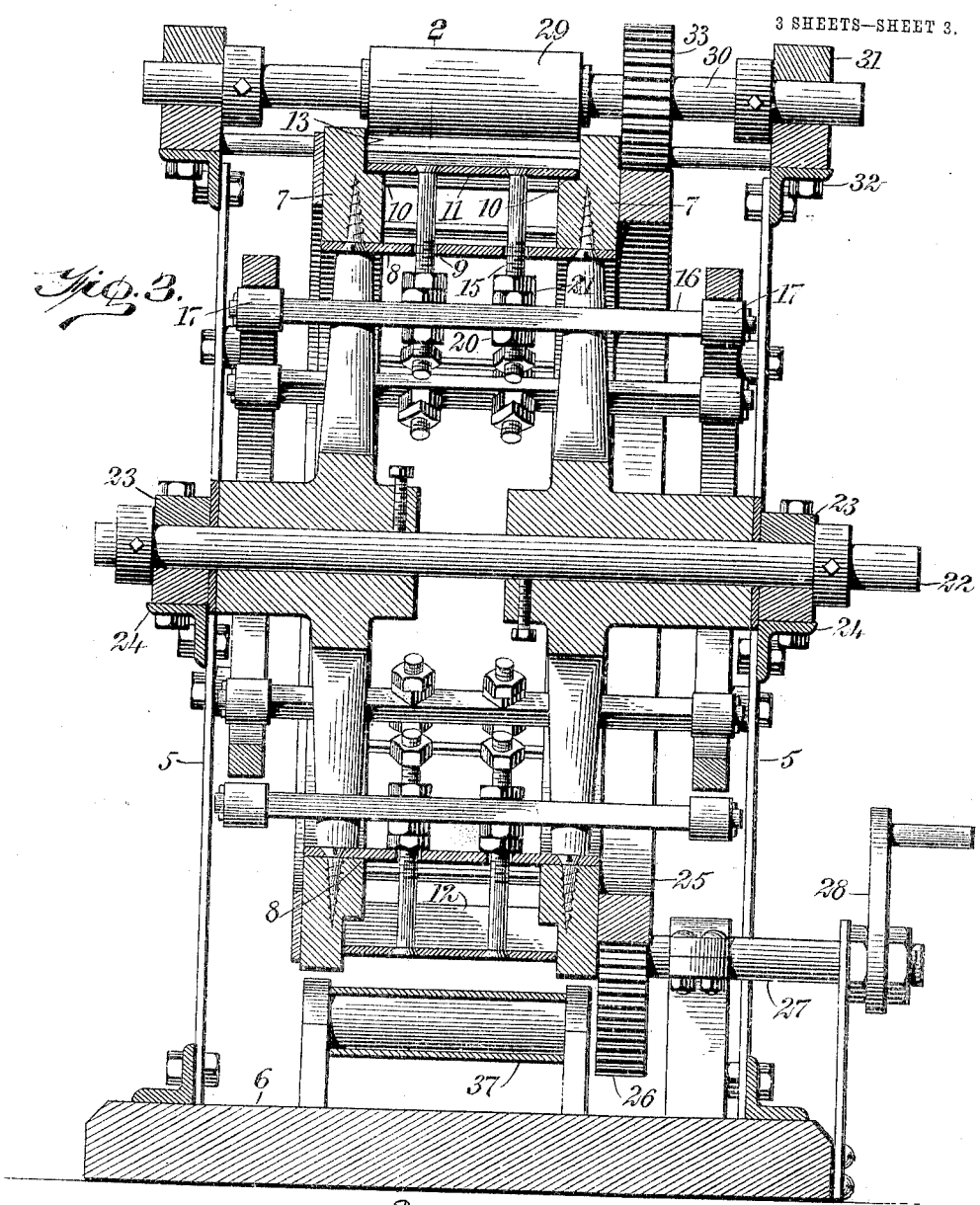
Figure 5:
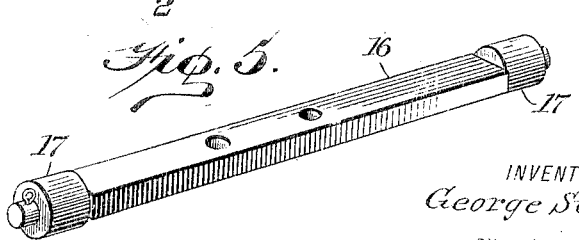

Figure 1 is a side elevation of a machine for molding plastic material embodying my invention. Fig. 2 is a section thereof on the line 2 2 of Fig. 3. Fig. 3 is a section on the line 3 3 of Fig. 2. Fig. 4 is a perspective view of one of the mold bottom plates. Fig. 5 shows one of the supporting-bars employed, and Fig. 6 is a perspective view of a flattened roller that may be employed for certain work.

Referring to the drawings, 5 indicates the side frames of the machine, extended upward from a base 6. Supported in the frame is a rotary mold-carrying part, consisting of spaced rims 7, which at regular intervals are connected together at the inner side by cross-plates 8, having perforations 9, the purpose of which will be hereinafter described. The rims 7 on their inner sides are provided with annular shoulders 10, upon which the bottom plates 11 of the mold-sections are supported when said plates are in lowermost position. The rotary part is divided by transverse strips 12 into a plurality of mold-sections, these strips 12 forming the side walls of the mold-sections, while the end walls are formed by the projecting portions 13 of the rims 7. There is a movable bottom plate 11 for each mold-section. These plates may be perfectly plain on their outer surfaces or may be ornamented, if desired, to make impressions in the mold material. In making small articles, such as brick, each bottom plate may be divided into a plurality of sections by means of upwardly-extended walls 14. Screw-rods 15 extend inward from the bottom plates through the perforations 9 and engage with supporting or actuating bars 16, the ends of which are extended outward and provided with rollers 17 for engaging with segmental tracks 18 19 at opposite sides of the rotary part and connected rigidly to the side frames.

It will be noted that the segment-tracks 18 are somewhat longer than the tracks 19 and the upper and lower ends of tracks are spaced apart.

The degree of movement of the bottom plates may be regulated by nuts 20 21 on the screw-bolts, which pass through openings in the bar 16. The rotary mold-carrying device is rigidly secured to a shaft 22, having bearings in blocks 23, supported on cross-bars 24 on the side frames, and attached to the outer side of one of the rims 7 is a gear-ring 25, meshing with a driving gear-wheel 26 on a counter-shaft 27, which may be driven by any suitable power, although I have here shown a crank 28 as connected to said shaft.

Arranged over the rotary mold-carrying device is a pressing-roller 29, having its shaft 30 engaged in bearings 31 on cross-bars 32, attached to the side frames, and on this shaft 30 is a pinion 33, meshing with the teeth on the ring 25. This roller 29 is designed to press the plastic material tightly into the mold-sections as said material passes underneath the roller. This roller, however, will give a slightly convexed outer surface to the material, and when a flat surface is desired I provide a flattening-roller 34, arranged forward of the pressing-roller. This flattening-roller 34 is oval in cross-section and may be rotated by any suitable means. When not desired for use, the flattening-roller may be readily removed from the machine.

In the operation as the machine rotates the rollers 17 for a number of the plates will engage with the outer sides of the segment-tracks 19, holding the bottom plates in outermost position, as indicated at the right-hand side of Fig. 2. Upon reaching the upper end of the tracks 19 the plates will move downward by engaging with the cam ends 35 of the tracks 18, and the rollers 17 will then engage with the inner sides of said tracks 18, and thus the bottom plates will be held in their innermost or lowered position. The material to be molded is fed into the sections just before the sections reach the pressing-roller 29. Upon passing off the lower ends of the tracks 18 the roller 17 will engage with the bevel or cam end 36 of the tracks 19, and the rollers will pass into engagement with the outer sides of the tracks 19, thus forcing the bottom plates outward and ejecting the mold material onto an endless carrier 37.

Having thus described my invention, I claim as new and desire to secure by Letters Patent—

1. A machine for the purpose specified, comprising a rotary part consisting of spaced rims, a shaft on which the rims are mounted, the said rotary part being divided into a plurality of mold-sections and the said rims having annular shoulders on their inner sides, bottom plates in the mold-sections adapted to engage the said shoulders, perforated plates connecting the rims, screw-bolts extended from the bottom plates through the perforations of the plates, supporting-bars to which said screw-bolts are adjustably attached, opposite segmental tracks secured in the machine-frame and having their ends spaced apart, rollers on said supporting-bars for engaging with the outer surfaces of one set of segmental tracks and with the inner surfaces of the inner set of segmental tracks, and a pressure-roller rotated from the mold-carrying devices.

2. In a machine for the purpose specified, side frames, a shaft supported by the side frames, rims mounted on the shaft and spaced apart, partition-plates extended between the rims and forming walls of mold-sections, bottom plates movable in the mold-sections, perforated cross-plates connected to the inner sides of said rims, screw-rods extended from the bottom plates through the perforations of said cross-plates, supporting-bars with which said screw-rods have adjustable connection, two pairs of segmental tracks secured in the frame of the machine, one pair being at one side of the machine, and the other pair at the other side of the machine, the ends of the two pairs of tracks being spaced apart, rollers on said supporting-bars adapted to engage with the outer surfaces of one pair of tracks, and with the inner surfaces of the other pair of tracks, a gear-ring secured to one of said rims, a driving-gear engaging with said gear-ring, a presser-roller, and a gear-wheel on the shaft of said roller engaging with said gear-ring.

3. In a machine for the purpose specified, a rotary part having a plurality of peripheral mold-sections, movable bottom plates for said mold-sections, a presser-roller arranged over the rotary part, and a flattening-roller substantially oval in cross-section.

In testimony whereof I have signed my name to this specification in the presence of two subscribing witnesses.

GEORGE STEWART.

Witnesses:
G. W. EGBERT,
J. T. STEWART.